June 7, 1927.

M. L. HORNER ET AL

FAVOR

Original Filed Aug. 17, 1925

1,631,205

Inventors
Marie Louise Horner
Marie Mathilde Horner

By  J. R. Morrill
    Attorney

Patented June 7, 1927.

1,631,205

UNITED STATES PATENT OFFICE.

MARIE LOUISE HORNER AND MARIE MATHILDE HORNER, OF NEW ORLEANS, LOUISIANA.

FAVOR.

Application filed August 17, 1925, Serial No. 50,788. Renewed April 29, 1927.

This invention relates to favors and has for an object to provide an article of the class, preferably composed of an egg in whole or in part, but including the use of any ovoid member associated with such accessories as to make it self-sustaining and to give it the representation or caricature of a human countenance or other appropriate figuration.

A further object of the invention is to employ an egg or egg shell or other ovoid member supported upon a base adapted to hold the member in any stable position, as for instance with its major axis normally vertical, the base entering into and forming a part of the decorative scheme with a head covering or other appropriate structure upon the upper part of the member between which and the base the member is provided with drawing, painting or other means of representing a human face or caricature thereof, or other appropriate figuration.

With these and other objects in view, the invention comprises certain novel arrangements, constructions and combinations as disclosed in the drawings, together with equivalents thereof as will be hereinafter more fully described and claimed.

In the drawings.

Like characters of reference indicate corresponding parts throughout the several views.

Figure 1:
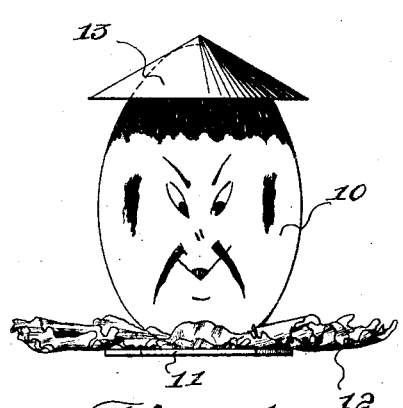
Figure 1 is a view of one development of the favor in front elevation.
Figure 2:
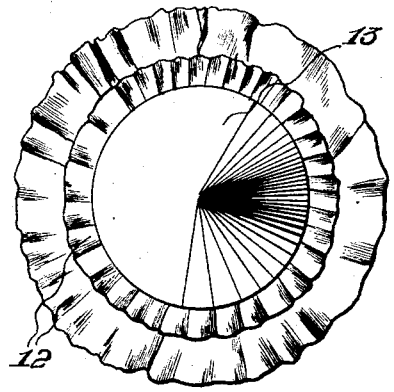
Figure 2 is a top plan view.
Figure 3:
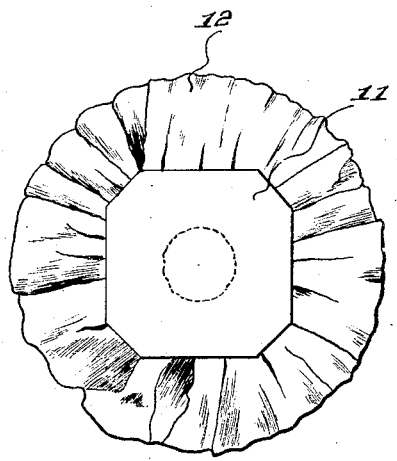
Figure 3 is an inverted plan view.

In the construction of the favor which forms the subject matter of this application, it is proposed to employ an egg, either in its natural condition or boiled, or with the contents removed from the shell, or other ovoid member analogizing an egg which is represented in the drawing at 10.

Figure 4:
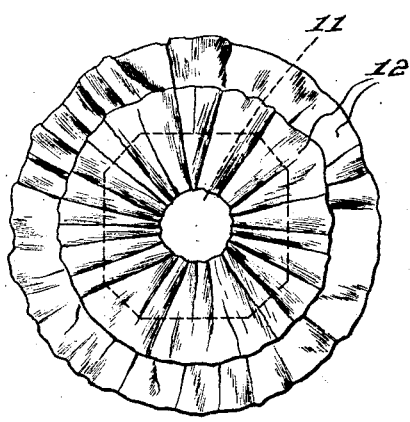
Figure 4 is a top plan view of the base with the ovoid member removed.

This member 10 is erected upon a base comprising a relatively rigid sheet of material 11 with a fanciful application of material 12, preferably leaving a central opening as indicated more particularly at Figure 4, to furnish space for the rigid attachment of the ovoid member 10, the material 12 preferably taking the form of a neck decoration or ruff and also serving the purpose of hiding the sheet 11 from view.

Upon the top of the member 10 a covering 13 is secured which, when a human head is suggested by the drawing, will take the form of a head covering, such for instance as a hat, cap, bonnet or the like, and it is to be understood that the particular form of the ruff 12 or the hat 13, as shown in the drawings, is no limitation upon the invention and that any form of construction for serving the purposes mentioned and similarly applied, composed of any material, is within the scope of the invention.

At Figure 1 a caricature of a human countenance is shown upon the ovoid member 10 and it is the purpose of the invention to decorate each of said members 10 with some representation of a human countenance or caricature thereof, or other appropriate figuration, but the invention is in no way limited to the particular caricature shown in Figure 1 and includes any and all other representations or caricatures of human features, or the like.

The device completed will stand upon its own base as shown at Figure 1 and forms an attractive favor, souvenir, present or other article of merchandise.

What we claim as new is:

An article of merchandise comprising an ovoid member decorated to suggest a countenance, a rigid base to which said ovoid member is attached adapted to hold said member with the countenance in normal position, an ornamental material attached to the base representing a neck decoration relative to the countenance, and a cover for the top of the ovoid member representing a head covering corresponding in decorative effect to the countenance and the neck decoration.

In testimony whereof we affix our signatures.

MARIE LOUISE HORNER.
MARIE MATHILDE HORNER.